United States Patent
Sekine et al.

(10) Patent No.: US 10,063,026 B2
(45) Date of Patent: Aug. 28, 2018

(54) LASER BEAM AMPLIFICATION DEVICE

(71) Applicant: HAMAMATSU PHOTONICS K.K., Hamamatsu-shi, Shizuoka (JP)

(72) Inventors: Takashi Sekine, Hamamatsu (JP); Yoshinori Kato, Hamamatsu (JP); Yoshinori Tamaoki, Hamamatsu (JP); Takashi Kurita, Hamamatsu (JP); Toshiyuki Kawashima, Hamamatsu (JP); Takaaki Morita, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/543,375

(22) PCT Filed: Jan. 13, 2016

(86) PCT No.: PCT/JP2016/050808
§ 371 (c)(1),
(2) Date: Jul. 13, 2017

(87) PCT Pub. No.: WO2016/117425
PCT Pub. Date: Jul. 28, 2016

(65) Prior Publication Data
US 2018/0006423 A1  Jan. 4, 2018

(30) Foreign Application Priority Data
Jan. 19, 2015  (JP) .................... 2015-007859

(51) Int. Cl.
*H01S 3/04*  (2006.01)
*H01S 3/10*  (2006.01)
(Continued)

(52) U.S. Cl.
CPC .......... *H01S 3/10007* (2013.01); *H01S 3/027* (2013.01); *H01S 3/042* (2013.01);
(Continued)

(58) Field of Classification Search
CPC ........ H01S 3/042; H01S 3/027; H01S 3/0604; H01S 3/07; H01S 3/0941; H01S 3/1643;
(Continued)

(56) References Cited

U.S. PATENT DOCUMENTS 3,611,190 A   10/1971  Keefe, Jr.
3,711,790 A   1/1973   Gans
(Continued)

FOREIGN PATENT DOCUMENTS

| JP | S6016482 A | 1/1985 |
| JP | H06-29595 A | 2/1994 |
| JP | 2009-49439 A | 3/2009 |

OTHER PUBLICATIONS

International Preliminary Report on Patentability dated Aug. 3, 2017 for PCT/JP2016/050808.

*Primary Examiner* — Kinam Park
(74) *Attorney, Agent, or Firm* — Drinker Biddle & Reath LLP (57) ABSTRACT

A laser medium unit 10 in a laser beam amplification device includes a plurality of laser media 14. A cooling medium flow path F1 is provided around the laser medium unit 10 to cool the laser medium unit 10 from outside. A sealed space between the laser media 14 is filled with gas or liquid, and a laser beam for passing through the sealed space is not interfered by a cooling medium flowing outside. Therefore, a fluctuation of an amplified laser beam is prevented, and a quality such as stability and focusing characteristics of the laser beam is improved.

4 Claims, 6 Drawing Sheets

(51) Int. Cl.
*H01S 3/042* (2006.01)
*H01S 3/16* (2006.01)
*H01S 3/06* (2006.01)
*H01S 3/0941* (2006.01)
*H01S 3/07* (2006.01)
*H01S 3/02* (2006.01)
*H01S 3/137* (2006.01)
*H01S 3/092* (2006.01)

(52) U.S. Cl.
CPC .............. *H01S 3/0604* (2013.01); *H01S 3/07* (2013.01); *H01S 3/0941* (2013.01); *H01S 3/10092* (2013.01); *H01S 3/137* (2013.01); *H01S 3/1643* (2013.01); *H01S 3/092* (2013.01); *H01S 3/1603* (2013.01); *H01S 2301/02* (2013.01)

(58) Field of Classification Search
CPC .... H01S 3/1603; H01S 3/137; H01S 3/10092; H01S 3/10007; H01S 3/092; H01S 2301/02
See application file for complete search history.

(56) References Cited

U.S. PATENT DOCUMENTS

| | | |
|---|---|---|
| 3,715,682 A | 2/1973 | Young |
| 3,766,493 A | 10/1973 | Nicolai et al. |
| 2003/0161365 A1* | 8/2003 | Perry ............... H01S 3/025 372/35 |
| 2006/0007800 A1* | 1/2006 | Basu ................ F28D 15/00 369/44.14 |
| 2006/0114951 A1 | 6/2006 | Chou et al. |
| 2012/0213236 A1* | 8/2012 | Lundquist ......... H01S 3/0604 372/25 |
| 2012/0313016 A1* | 12/2012 | Fleurov ............. H05G 2/005 250/504 R |

* cited by examiner

Fig.6

LASER BEAM AMPLIFICATION DEVICE

TECHNICAL FIELD

The present invention relates to a large-output laser beam amplification device.

BACKGROUND ART

In recent years, researches and developments such as basic science, material development, medical application, and the like have been actively carried out for new industrial development using a large laser. To obtain a large-output laser beam, a laser beam amplification device for amplifying input seed light is required. The laser beam amplification device includes a laser medium unit and an excitation light source for causing excitation light to enter the laser medium unit. The laser beam amplification device cools a laser medium by flowing a cooling medium to contact with a main surface of the laser medium in the laser medium unit (refer to Patent Literature 1).

CITATION LIST

Patent Literature

Patent Literature 1: Japanese Unexamined Patent Publication No. 2009-49439

SUMMARY OF INVENTION

Technical Problem

However, although it is necessary to cool the laser medium, since the amplified laser beam passes through the cooling medium for flowing on the main surface, the quality of the laser beam such as stability and focusing characteristics is deteriorated due to a flow speed of the cooling medium and the like.

The present invention has been made in consideration of such problems. An object of the present invention is to provide a laser beam amplification device capable of amplifying a laser beam with high quality.

Solution to Problem

To solve the above problems, a first laser beam amplification device includes a laser medium unit, an excitation light source for causing excitation light to enter the laser medium unit, and a cooling medium flow path arranged around the laser medium unit. In the laser beam amplification device for amplifying and outputting a laser beam input to the laser medium unit, the laser medium unit includes a plate-like first laser medium, a plate-like second laser medium, and a sealing material arranged between the first and the second laser media. The first and the second laser media are aligned along a thickness direction of the first and the second laser media, and a space between the first and the second laser media is a sealed space and is under a reduced pressure environment or is filled with gas.

According to this device, the laser medium is excited by making the excitation light enter the laser medium. When the laser beam enters the laser medium as the seed light, the amplified laser beam is output from the laser medium. In addition, in a case where the plurality of laser media is provided, a multiplication factor also increases.

Here, a cooling medium flow path is provided around the laser medium unit and cools the laser medium unit from outside. The space between the first and the second laser media is a sealed space and is under a reduced pressure environment such as a vacuum or is filled with gas. Therefore, since the laser beam for passing through the space is not interfered by the cooling medium flowing on the main surface of the laser medium, a fluctuation of the amplified laser beam can be reduced, and the quality such as the stability and the focusing characteristics of the laser beam is improved.

In addition, in a case where the space is filled with gas, there is an advantage that reduction of energy loss due to Fresnel reflection and occurrence of wavefront distortion can be prevented more than a case where a solid is positioned in the space.

In a second laser beam amplification device, materials of the first and the second laser media are ceramic laser media.

As a laser medium, glass having a low thermal conductivity can be used. However, to output laser beam with high pulse energy at a high repetition frequency, it is preferable that a thermal conductivity of the laser medium be high from the viewpoint of the cooling performance. It has been known that the ceramic laser medium has a thermal conductivity higher than that of glass or the like, and the ceramic laser medium can output a laser beam with high pulse energy at a high repetition frequency.

As a ceramic laser medium, for example, YAG containing at least one dopant selected from among rare earth metals, particularly Nd, Yb, Er, Ce, Cr, Cr:Nd, and Tm as a dopant can be used. In addition, as a ceramic laser medium, yttria ($Y_2O_3$) containing the above rare earth metals as the dopant can be used. Further, YAG ($Y_3Al_5O_{12}$), $Lu_2O_3$, and $Sc_2O_3$ can be used.

Also, regarding such a transparent ceramic crystal, the upper limit value of the thickness of the laser medium obtained by the current manufacturing method is about 10 mm. However, according to the present device, since the plurality of laser media is used, an amplification factor of the laser beam which is finally output can be increased.

In a third laser beam amplification device, the laser medium unit includes a pair of flanges arranged opposite to each other and three or more support columns for connecting between the flanges and capable of adjusting a distance between the flanges. The alignment direction of the first and the second laser media coincides with the longitudinal direction of the support column, and the pressure to be applied to the sealing material can be adjusted by adjusting the distance between the flanges.

Since the three or more support columns are interposed between the flanges, the position of the main surface of the flange is uniquely determined according to the position of the support columns. The sealing material for maintaining the sealed state is interposed between the first and the second laser media. In a case where the pressure to be applied to the sealing material by the media is appropriate, the sealed state is sufficiently maintained. Since the length between the flanges can be adjusted, the pressure to be applied to the sealing material between the laser media can be set to a desired value, and the sealed state can be sufficiently maintained.

A fourth laser beam amplification device includes a laser medium unit, an excitation light source for causing excitation light to enter the laser medium unit, and a cooling medium flow path arranged around the laser medium unit. In the laser beam amplification device for amplifying and outputting a laser beam input to the laser medium unit, the laser medium unit includes a plate-like first laser medium, a plate-like second laser medium, and a sealing material arranged between the first and the second laser media. The first and the second laser media are aligned in the thickness direction of the first and the second media, and a space between the first and the second laser media is a sealed space and is filled with heavy water or fluorine-based inert liquid. In a case where the space is filled with heavy water or fluorine-based inert liquid, there is an advantage that reduction of energy loss due to Fresnel reflection and occurrence of wavefront distortion can be prevented more than a case where a solid is positioned in the space.

Advantageous Effects of Invention

According to the laser beam amplification device according to the present invention, a laser beam can be amplified with high quality.

DESCRIPTION OF EMBODIMENTS

The laser beam amplification device according to the embodiment is described below. The same components are respectively denoted with the same reference numerals, and redundant description is omitted.

Figure 1:
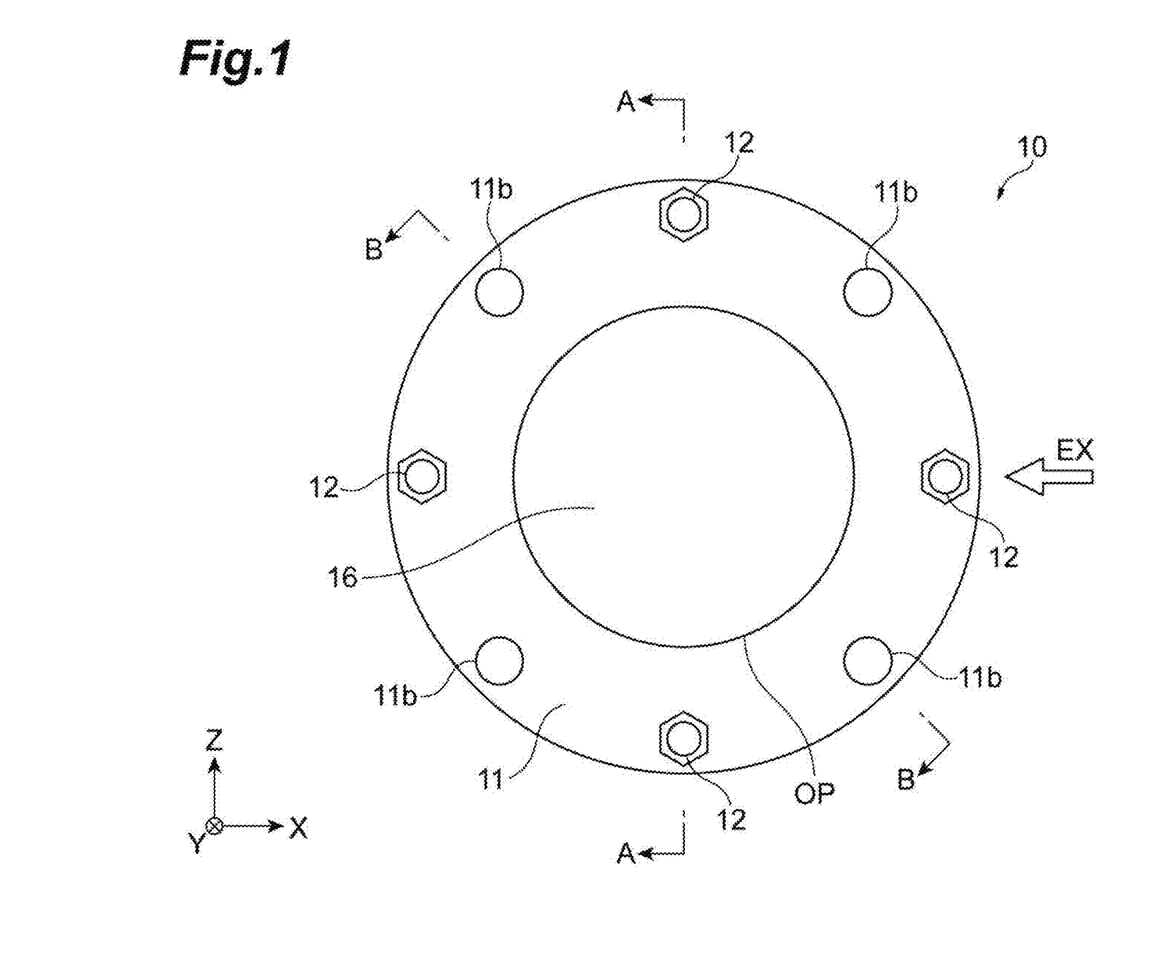
FIG. 1 is a front view of a laser medium unit.

FIG. 1 is a front view of the laser medium unit. In FIG. 1, an XYZ three-dimensional orthogonal coordinate system is also illustrated. A traveling direction of a laser beam as seed light to be amplified is the Y-axis direction, and the two directions perpendicular to the Y axis are the X-axis direction and the Z-axis direction.

The laser beam amplification device according to the embodiment includes a laser medium unit 10 where the seed light enters. The laser medium unit 10 is a columnar unit including a plurality of plate-like laser media. The laser medium plates are laminated and aligned along the traveling direction of the seed light (positive direction of Y axis). Excitation light EX is emitted into the laser medium from the outside of the laser medium unit 10. The plurality of excitation light beams EX is emitted from a plurality of light sources toward the central part of each laser medium. When the excitation light EX is emitted, the excitation light enters the laser medium from the outer peripheral surface of the laser medium, and the laser medium is excited. Then, when the excited laser medium is irradiated with the seed light, the laser beam is amplified. For example, in a case where a laser medium composed of ytterbium (Yb)-added YAG is used, wavelengths $\lambda 1$ of the seed light and spontaneous emission light from the laser medium are 1030 nm, and a wavelength $\lambda 2$ of the excitation light is 940 nm ($\lambda 1 > \lambda 2$). The added concentration of Yb in the laser medium can be preferably set to 0.15 mass % to 0.25 mass %.

Figure 2:
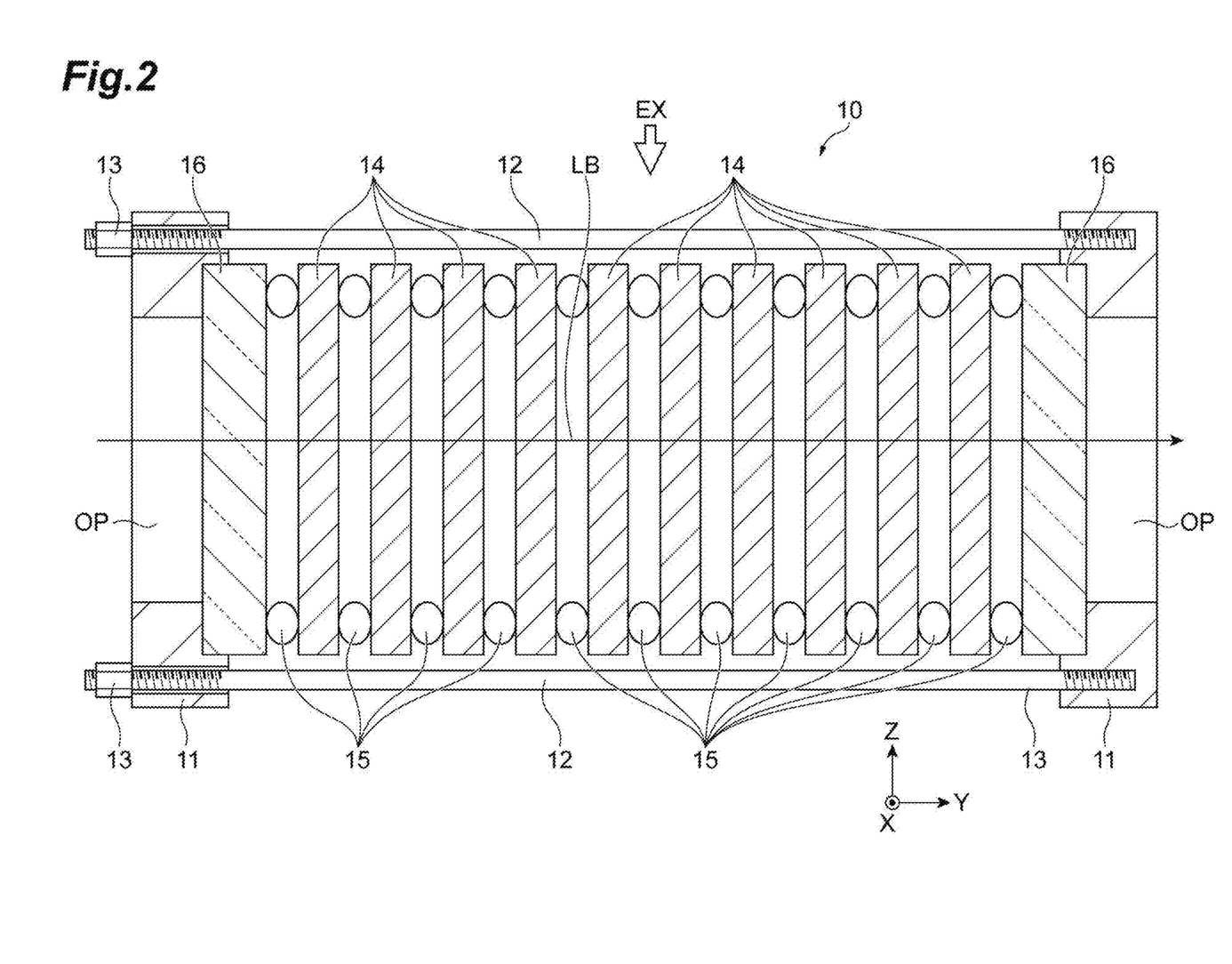
FIG. 2 is a sectional view of the laser medium unit taken along an arrow A-A.
Figure 3:
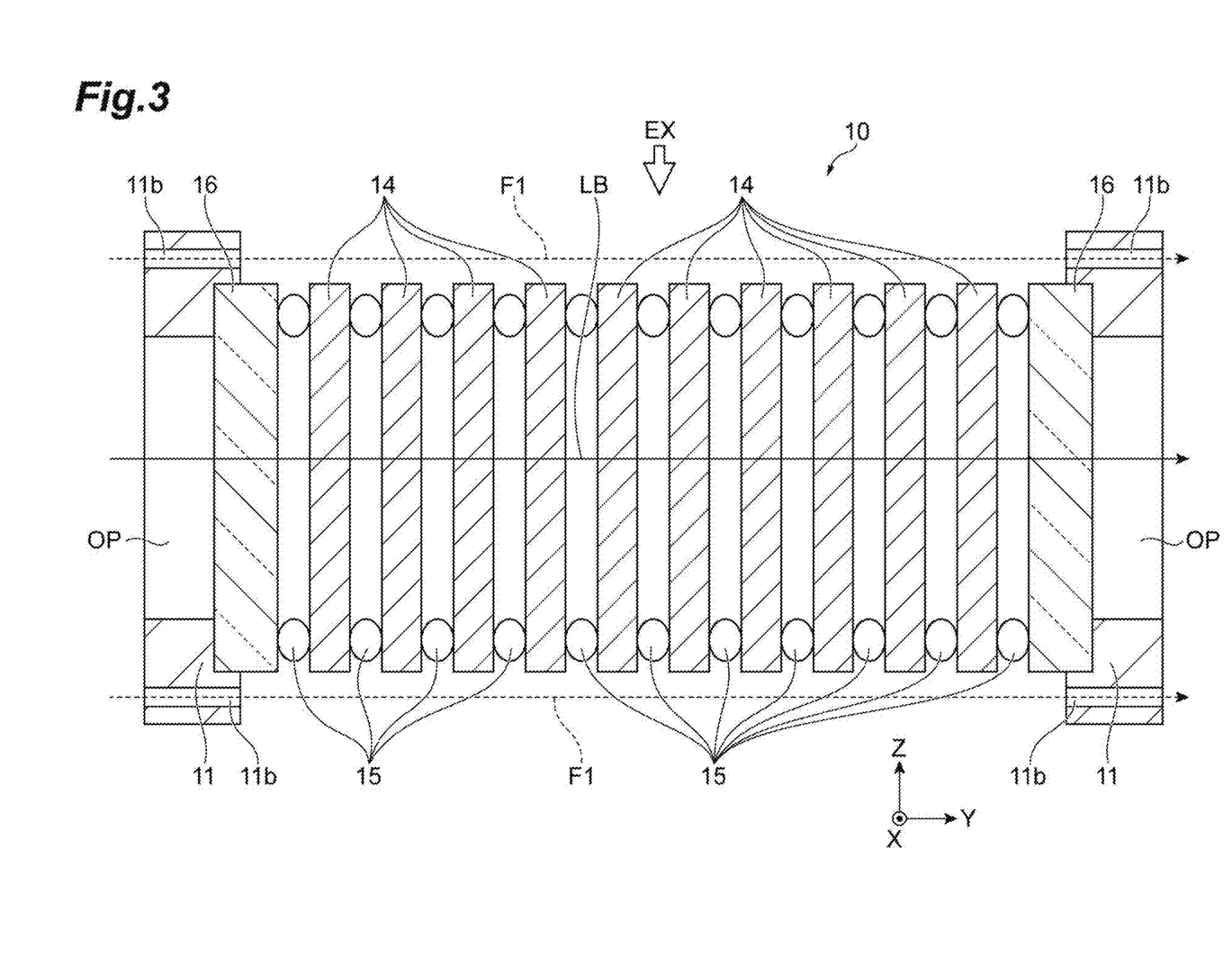
FIG. 3 is a sectional view of the laser medium unit taken along an arrow B-B.

FIG. 2 is a sectional view of the laser medium unit illustrated in FIG. 1 taken along an arrow A-A, and FIG. 3 is a sectional view of the laser medium unit taken along an arrow B-B.

The laser medium unit 10 includes a pair of metallic flanges 11 arranged to be opposite to each other and a plurality of support columns 12 connecting between the flanges 11 and capable of adjusting a distance between the flanges 11. Although four support columns 12 are illustrated in FIG. 1, the position of the main surface (XZ plane) of the flange 11 can be easily fixed if the number of the support columns 12 is equal to or more than three. That is, since the plane is determined by three points, three or more support columns are interposed between the flanges 11 so that the position of the main surface of the flange 11 can be uniquely determined based on the positions of the support columns.

Screw parts are provided at both ends of the support column 12. The flange 11 has an annular shape having an opening OP. An opening (through-hole) through which the screw part of the support column 12 passes is provided in one flange 11, and a screw hole to fix the screw part of the support column 12 is provided in the other flange 11 opposed to the flange 11. The screw part of the support column 12 is screwed with the screw hole of the flange 11. When a nut 13 screwed with the screw part of the support column 12 passing through one flange 11 is included and the nut 13 is rotated, the nut 13 pushes one flange 11 in the Y-axis direction so that a distance between the two of flanges 11 is reduced.

A plurality of laser medium plates is laminated and arranged between the two flanges 11. That is, a plurality of disk-shaped and flat plate-like laser media 14 is arranged along the Y-axis direction. A sealing material 15 is interposed between the adjacent laser media 14. Window members 16 formed of quartz glass or the like are arranged at both end positions of the laser medium unit 10 in the Y-axis direction instead of the laser medium 14, and the sealing material 15 is also interposed between the laser medium 14 and the window member 16. The sealing material 15 has an annular shape. When the material of the sealing material 15 can maintain a sealed state of the space between the laser media 14, the material is not especially limited, and a silicone O ring can be applied as the material. Resin, rubber, glass, ceramics, or metal such as Cu and Al can be used as the sealing material 15. The sealing material 15 may be pressed on the surface of the laser medium 14 by alternately laminating the laser medium 14 and the sealing material 15 and applying the pressure in the Y-axis direction. The sealing material 15 may be bonded to the laser medium 14 with solder or an adhesive.

All the material of the laser medium 14 is a ceramic laser medium. As a laser medium, glass having a low thermal conductivity can be used. However, to output laser beam with high pulse energy at a high repetition frequency, it is preferable that a thermal conductivity of the laser medium be high from the viewpoint of the cooling performance. It has been known that the ceramic laser medium has properties equivalent to that of a single crystal and has a thermal conductivity higher than that of glass or the like, and the ceramic laser medium can output a laser beam with high pulse energy at a high repetition frequency.

As a ceramic laser medium, for example, YAG containing at least one dopant selected from among rare earth metals, particularly Nd, Yb, Er, Ce, Cr, Cr:Nd, and Tm as a dopant can be used. In addition, as a ceramic laser medium, yttria ($Y_2O_3$) containing the above rare earth metals as the dopant can be used. Further, YAG ($Y_3Al_5O_{12}$), $Lu_2O_3$, and $Sc_2O_3$ can be used.

Regarding such a transparent ceramic crystal, although the upper limit value of the thickness of the laser medium obtained by the current manufacturing method is about 10 mm, it is also possible to use a ceramic laser medium having the thickness equal to or more than 10 mm. In addition, in a case where the ceramic laser medium has a thickness equal to or more than one mm and equal to or less than 20 mm, the structure of the present invention exhibits particularly excellent effects on the rigidity, the cooling performance, and the quality of the laser beam. According to the present device, since the plurality of laser media is used, an amplification factor of the laser beam to be finally output can be increased.

As illustrated in FIGS. 1 to 3, the laser medium 14 is irradiated with excitation light EX from a plurality of directions along a radial direction perpendicular to the Y axis of the laser medium unit 10. The excitation light EX excites each laser medium 14. A laser beam LB as seed light enters a laser medium group perpendicularly to the main surface (XZ plane) of the laser medium via one window member 16 along the Y axis, and the laser beam LB passes though these laser media 14 and is amplified and output from the other window member 16.

If the adjacent laser media 14 are the flat plate-like first and second laser media, the alignment direction of these laser media 14 coincides with the longitudinal direction (Y axis) of the support column 12, and the pressure applied to the sealing material 15 can be adjusted by adjusting the distance between the flanges 11. The sealing material 15 for maintaining the sealed state is interposed between the first and the second laser media. However, in a case where the pressure applied to the sealing material 15 by the laser medium is appropriate, the sealed state is sufficiently maintained. Since the length between the flanges 11 can be adjusted, the pressure applied to the sealing material 15 between the laser media can be set to a desired value, and the sealed state in the space between the laser media can be sufficiently maintained.

That is, the sealing material 15 is arranged between the first and the second laser media, and the first and the second laser media are aligned along the thickness direction thereof. The space between the first and the second laser media is a sealed space and is under a reduced pressure environment (less than one atm, including vacuum) or is filled with gas (inert gas (air, $N_2$, and $CO_2$), rare gas (Ar and He), heavy water, or fluorine-based inert liquid). Also, in a case where the space is filled with gas, there is an advantage that reduction of energy loss due to Fresnel reflection and occurrence of wavefront distortion can be prevented more than a case where a solid is positioned in the space. Also, in a case where the space is filled with heavy water or fluorine-based inert liquid, there is an advantage that reduction of energy loss due to Fresnel reflection and occurrence of wavefront distortion can be prevented more than a case where a solid is positioned in the space. As the fluorine-based inert liquid, Fluorinert (trademark) (fluorine-based inert liquid) manufactured by 3M Japan Ltd. and the like can be used. However, as liquid to be filled, water, refractive index matching liquid, oil, and the like can also be used, in addition to fluorine-based inert liquid.

According to this device, the laser medium 14 is excited by making the excitation light EX enter the laser medium 14. When the laser beam LB enters the laser medium 14 as the seed light, the amplified laser beam LB is output from the window member 16 through the laser medium 14. Since the plurality of laser media 14 is provided, a multiplication factor is increased.

Here, a cooling medium flow path F1 is provided around the laser medium unit 10 and cools the laser medium unit from outside. The space between the first and the second laser media is a sealed space and is under a reduced pressure environment such as a vacuum or is filled with gas. Therefore, since the laser beam LB for passing through the space is not interfered by the cooling medium flowing on the main surface of the laser medium 14 as conventional, a fluctuation of the amplified laser beam LB is reduced, and the quality such as the stability and the focusing characteristics of the laser beam is improved.

In addition, as illustrated in FIGS. 1 and 3, a hole 11b passing through the flange 11 in the Y-axis direction is provided in the flange 11. A tube which is not shown communicates with the outside of the hole 11b, and a cooling medium in contact with the outer surface of the laser medium unit 10 is supplied or discharged from the hole 11b. The cooling medium introduced from the hole 11b of one of the flanges 11 flows along the Y-axis direction and is discharged from the hole 11b of the other flange 11 as indicated by a dotted arrow F1 illustrated in FIG. 3 while having contact with the surface of the laser medium 14 around the Y axis.

The cooling medium flow path F1 is formed between the laser medium unit 10 and a cylindrical body surrounding the laser medium unit 10. Such a cylindrical body may be provided outside the excitation light source as viewed from the laser medium unit 10 (cylindrical body 24 in FIG. 5), and in addition, the cylindrical body may be provided between the laser medium unit 10 and the excitation light source (transparent cylindrical body 30 in FIG. 5). In a case where the cylindrical body for defining the cooling medium flow path F1 is arranged between the laser medium unit 10 and the excitation light source (the transparent cylindrical body 30 in FIG. 5), the transparent cylindrical body 30 is formed of a transparent material for transmitting the excitation light, for example, quartz glass.

Figure 4:
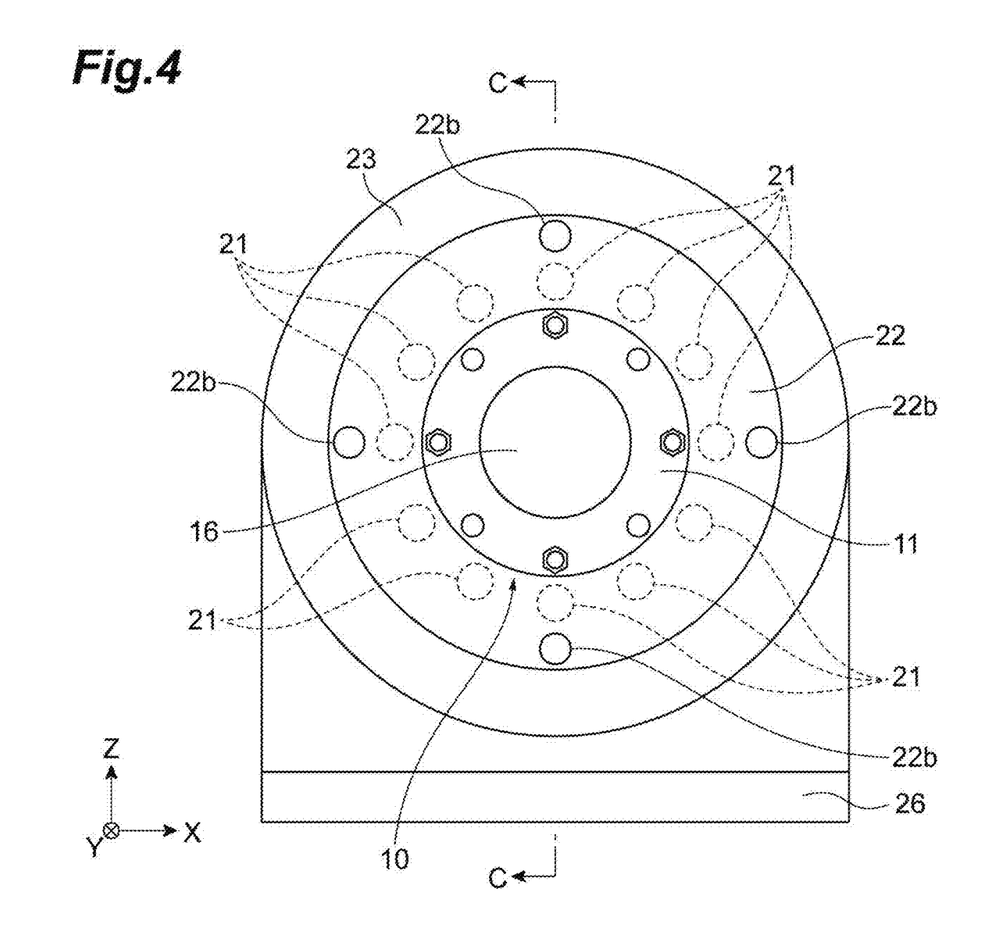
FIG. 4 is a front view of a laser beam amplification device.
Figure 5:
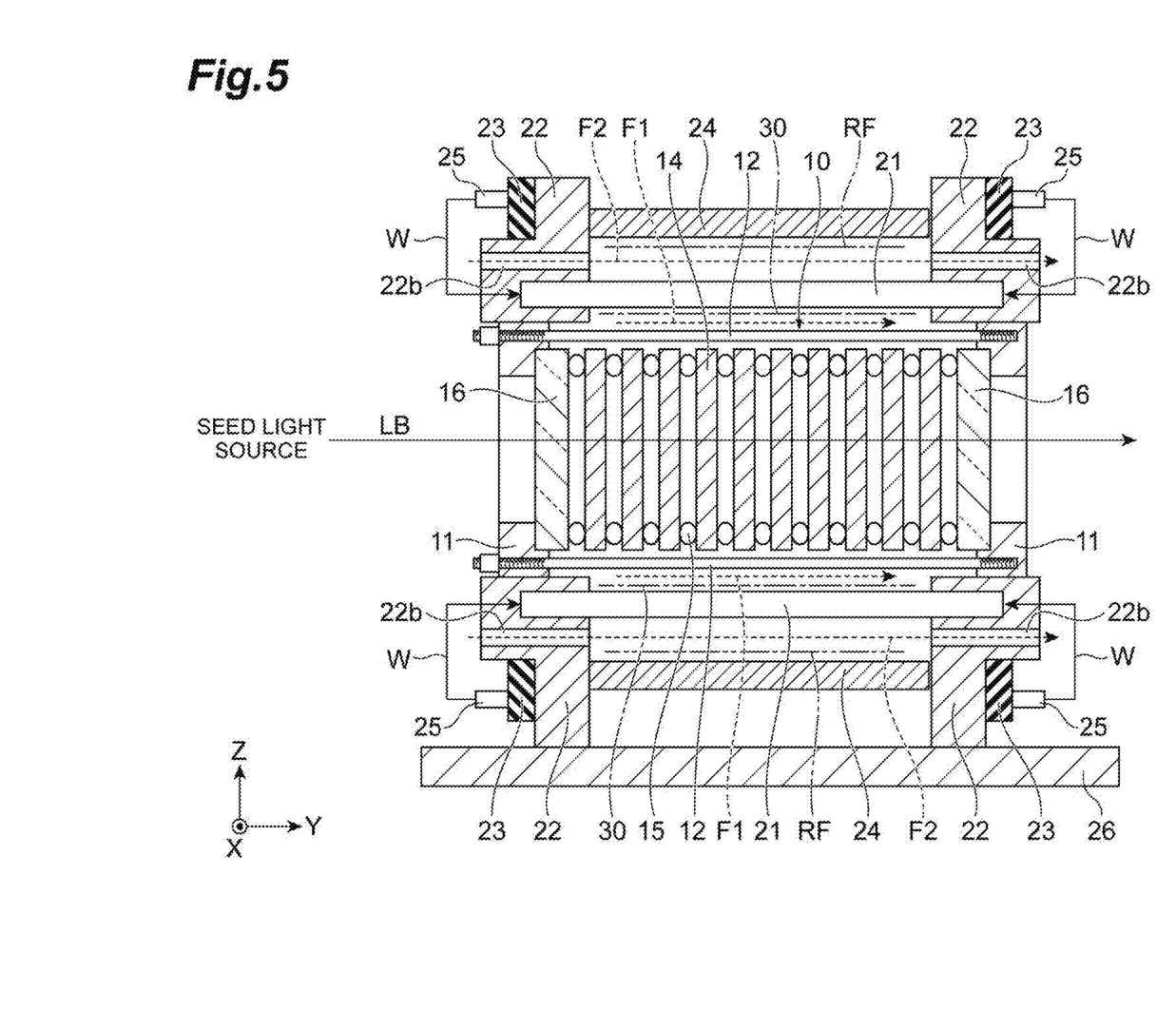
FIG. 5 is a sectional view of the laser beam amplification device taken along an arrow C-C.

FIG. 4 is a front view of the laser beam amplification device, and FIG. 5 is a sectional view of the laser beam amplification device taken along an arrow C-C.

The laser beam amplification device includes the laser medium unit 10, a plurality of excitation light sources 21 for causing the excitation light to enter the laser medium unit 10, and a cooling medium flow path F1 arranged around the laser medium unit 10 (refer to FIG. 5).

The laser beam amplification device amplifies and outputs the laser beam LB input from a seed light source such as a semiconductor laser device into the laser medium unit 10. The transparent cylindrical body 30 is arranged around the laser medium unit 10 as necessary and forms a cooling medium flow path. The excitation light is output from the excitation light source 21. The number of the excitation light sources 21 is 12 in FIG. 4. However, the number of the excitation light sources 21 may be equal to or more than 12 and equal to or less than 12.

The excitation light source 21 is fixed to a pair of substantially annular metallic support members 22 provided outside the laser medium unit 10. An electrode part of the excitation light source 21 and the support member 22 are insulated from each other. The support member 22 has a flange-shaped lip part, and an annular insulator 23 is fixed on the lip part. A plurality of terminals 25 is fixed on the insulator 23, and power is supplied from the terminal 25 to the excitation light source 21 via wiring W. The plurality of excitation light sources 21 may be connected in series and in parallel. The support member 22 has a hole 22b passing through the support member 22 in the Y-axis direction. A tube which is not shown communicates with the hole 22b of one support member 22 so that a cooling medium is introduced into a second cooling medium flow path F2. Also, a tube which is not shown communicates with the hole 22b of the other support member 22 so as to discharge the cooling medium. A reflection material (reflector) RF may be provided between the excitation light source 21 and a housing 24 so that the excitation light from the excitation light source 21 is efficiently transmitted to the laser medium unit.

The inner cylindrical surface of the support member 22 having a circular opening is fixed to the outer peripheral surface of the flange 11 of the laser medium unit 10. The pair of support members 22 is connected by a cylindrical body 24, and the second cooling medium flow path F2 is formed between the inner surface of the cylindrical body 24 and the excitation light source 21. The bottom surface of the support member 22 having the circular opening is fixed on a support base 26.

The structure of the sealing material 15 illustrated in FIG. 2 is not limited to the above-described structure.

Figure 6:
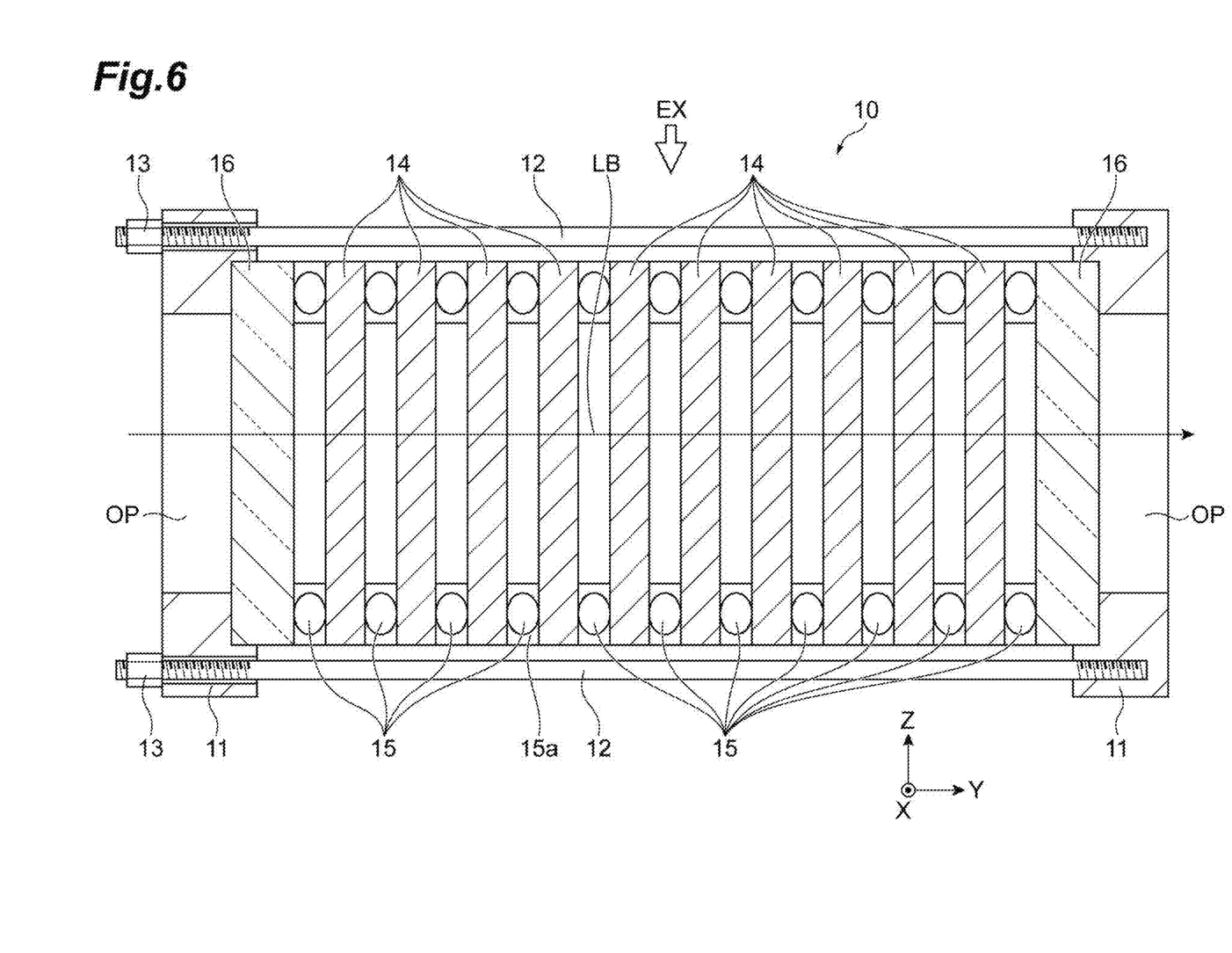
FIG. 6 is a sectional view of the laser medium unit taken along the arrow A-A in a case where auxiliary elements are provided near sealing materials (O ring).

FIG. 6 is a sectional view of the laser medium unit taken along the arrow A-A in a case where auxiliary elements are provided near sealing materials (O ring). At both ends of the sealing material 15 in the radial direction, auxiliary elements 15a are arranged to assist sealing by the sealing material 15. As the auxiliary element 15a, in addition to an adhesive material such as a resin, a spacer having higher rigidity than silicone O ring can be used. As a spacer, two annular spacers concentrically arranged around the Y axis can be employed, and an O ring as the sealing material 15 can be arranged between the annular spacers. As a spacer material, a glass material and ceramics can be used in addition to metals such as Cu and Al.

A prototype of the laser medium unit is made.

In this device, each laser medium formed of Nd; YAG has a diameter of 100 mm, a thickness of 10 mm, and the number of the laser media is 10. Heavy water is filled in a sealed space between the laser media. A laser beam having a wavelength of 1064 nm is used as seed light, and twelve flash lamps are used as the excitation light sources. In this case, the laminated ceramic laser media function as a large-sized laser rod. Since the laminated laser media has a sealed integrated structure, the cooling medium does not cross a propagation path of the laser beam. Therefore, the deterioration in the characteristics of the laser beam caused by the cooling media can be prevented. The diameter of the support column 12 is two mm. In addition, the overall size is about 30 cm, and the size is extremely small. However, a laser output equal to or more than 50 joules can be obtained.

An antireflection film for the seed light may be provided on a light incident surface of the main surface (XZ surface) of the window member. As a result of providing the antireflection film, the seed light can easily enter the window member of the preceding stage and can be easily emitted from the window member of the subsequent stage. Antireflection processing other than the antireflection film may be performed to the main surfaces. Similarly, an antireflection film for the seed light may be provided on a light incident surface of the laser medium. Antireflection processing other than the antireflection film may be performed to the main surfaces. The antireflection film or the antireflection processing may be provided not only on the light incident surface of each light transmitting element but also on a light emitting surface. As an antireflection film, for example, a dielectric multilayer film can be used. As a dielectric multilayer film, a laminate of titanium oxide and silicon oxide has been known. Refractive index matching liquid having a refractive index equal to that of the laser medium also can be used. In a case where rare gas is sealed in the sealed space between the laser media, deterioration in the laser medium due to the rare gas is prevented.

To prevent parasitic oscillation caused by spontaneous emission light, the laser medium may be surrounded by a cladding material. As a cladding material which absorbs spontaneous emission light (1064 nm), a samarium added material, a chromium added material, and a copper added material are exemplified. Specifically, samarium added YAG, samarium added glass, chromium added YAG chromium added glass, copper added YAG, copper added glass, and the like are used. To fix the cladding materials to the laser medium, they are bonded or joined to each other. In a case where the cladding material is bonded to the laser medium, an adhesive is interposed therebetween. In a case where an adhesive is used, an adhesive such as a resin refractive index matching adhesive and a glass refractive index matching adhesive can be used. In a case where an adhesive is not used, joint such as thermal diffusion bonding, optical contact, and ion sputtering bonding can be used. In a case where the outer surface of the laser medium part and the cladding material are made of ceramics, the ceramic sintering bonding can be used to fix them. Also, the material and the bonding method for the antireflection film relative to the excitation light (808 nm) are similar to those relative to the seed light or the spontaneous emission light.

In addition, the main surface of the laser medium may be inclined from a plane perpendicular to the Y axis so that the main surfaces of the laser media adjacent and opposed to each other are not arranged in parallel. With this arrangement, the parasitic oscillation caused by unnecessary reflection by the main surface can be reduced. That is, if each laser medium has a plate-like shape, it is not necessary for the laser medium to be a parallel flat plate, and the surface may be slightly inclined. As the cooling medium described above, liquid or gas can be used. As the liquid, water can be used. As the gas, helium gas or the like can be used. However, if the cooling medium has a cooling performance, the cooling medium is not limited to these.

REFERENCE SIGNS LIST 14 laser medium
12 support column
15 sealing material
11 flange

The invention claimed is:
1. A laser beam amplification device comprising:
a laser medium unit;
an excitation light source configured to cause excitation light to enter the laser medium unit; and
a cooling medium flow path configured to be arranged around the laser medium unit,
wherein the laser beam amplification device amplifies and outputs a laser beam input to the laser medium unit;
wherein the laser medium unit comprises:
a plate-like first laser medium,
a plate-like second laser medium, and
a sealing material arranged between the first and the second laser media;
wherein the first and the second laser media are aligned along a thickness direction of the first and the second laser media; and wherein a space between the first and the second laser media is a sealed space and is under a reduced pressure environment or is filled with gas.

2. The laser beam amplification device according to claim 1, wherein
materials of the first and the second laser media are ceramic laser media.

3. The laser beam amplification device according to claim 1, wherein
the laser medium unit includes a pair of flanges arranged opposed to each other and
three or more support columns for connecting the flanges and capable of adjusting a distance between the flanges,
an alignment direction of the first and the second laser media coincides with a longitudinal direction of the support column, and
a pressure to be applied to the sealing material is adjustable by adjusting the distance between the flanges.

4. A laser beam amplification device comprising:
a laser medium unit;
an excitation light source configured to cause excitation light to enter the laser medium unit; and
a cooling medium flow path configured to be arranged around the laser medium unit,
wherein the laser beam amplification device amplifies and outputs a laser beam input to the laser medium unit;
wherein the laser medium unit comprises:
a plate-like first laser medium,
a plate-like second laser medium, and
a sealing material arranged between the first and the second laser media;
wherein the first and the second laser media are aligned in a thickness direction of the first and the second laser media, and
a space between the first and the second laser media is a sealed space and is filled with heavy water or fluorine-based inert liquid.

* * * * *